US 6,591,343 B1
Jul. 8, 2003

(54) PREDECODE IN PARALLEL WITH TLB COMPARE

(75) Inventors: Gerard M. Col, Austin, TX (US); G. Glenn Henry, Austin, TX (US); Terry Parks, Austin, TX (US)

(73) Assignee: IP-First, LLC, Fremont, CA (US)

( * ) Notice: Subject to any disclaimer, the term of this patent is extended or adjusted under 35 U.S.C. 154(b) by 0 days.

(21) Appl. No.: 09/510,211

(22) Filed: Feb. 22, 2000

(51) Int. Cl.$^7$ ............................................... G06F 12/00
(52) U.S. Cl. ..................... 711/125; 711/140; 711/205; 711/128; 711/206; 711/207; 712/213
(58) Field of Search ..................... 712/213; 711/205, 711/206, 207, 128, 125, 140, 109

(56) References Cited

U.S. PATENT DOCUMENTS

| | | | | |
|---|---|---|---|---|
| 5,784,603 A | * | 7/1998 | Leung et al. | 712/234 |
| 5,794,003 A | * | 8/1998 | Sachs | 712/215 |
| 5,918,062 A | * | 6/1999 | Oberman et al. | 712/7 |
| 5,926,642 A | * | 7/1999 | Favor | 712/1 |
| 6,085,208 A | * | 7/2000 | Oberman et al. | 708/205 |
| 6,195,744 B1 | * | 2/2001 | Favor et al. | 712/215 |
| 6,421,696 B1 | * | 7/2002 | Horton | 708/404 |
| 2001/0051969 A1 | * | 12/2001 | Oberman et al. | 708/514 |
| 2003/0061258 A1 | * | 3/2003 | Oberman et al. | 709/102 |

* cited by examiner

*Primary Examiner*—Hong Kim
(74) *Attorney, Agent, or Firm*—Richard K. Huffman; James W. Huffman (57) ABSTRACT

An apparatus and method are provided for determining initial information about a macro instruction prior to decoding of the macro instruction by translation logic within a pipeline microprocessor. The apparatus includes an instruction cache divided into a number of cache ways, each of the cache ways storing a number of cache lines that have been retrieved from memory. As a linear address within a next instruction pointer is provided to retrieve a the macro instruction from the cache, indexed cache lines from each of the cache ways are predecoded by predecode logic. Predecoding is performed in parallel with translation of the linear address to a physical address by translation lookaside buffer logic. The bytes of the indexed cache lines, along with corresponding predecode information fields, are provided to way selection logic. When a cache hit occurs, the way selection logic forwards for translation the cache line bytes and predecode information fields that correspond to the cache way corresponding to the macro instruction.

16 Claims, 7 Drawing Sheets

FIG. 1 (Related Art)
Pipeline Microprocessor Stages

PREDECODE IN PARALLEL WITH TLB COMPARE

BACKGROUND OF THE INVENTION

1. Field of the Invention

This invention relates in general to the field of instruction execution in computers, and more particularly to an apparatus and method for predecoding macro instructions prior to translation.

2. Description of the Related Art

The architecture of a present day pipeline microprocessor consists of a path, or channel, or pipeline that is divided into stages. Each of the pipeline stages performs specific tasks related to the accomplishment of an overall operation that is directed by a programmed instruction. Software application programs are composed of sequences of macro instructions. As a macro instruction enters the first stage of the pipeline, certain tasks are accomplished. The macro instruction is then passed to subsequent stages for the execution of subsequent tasks. Following completion of a final task, the instruction completes execution and exits the pipeline. Execution of programmed instructions by a pipeline microprocessor is very much likened to the manufacture of items on an assembly line.

The efficiency of any assembly line is beneficially impacted by the following two factors: 1) keeping each stage of the assembly line occupied with work and 2) ensuring that the tasks performed within each stage are equally balanced, that is, optimizing the line so that no one stage creates a bottleneck. These same factors can also be said to affect the efficiency of a pipeline microprocessor. Consequently, it is incumbent upon microprocessor designers 1) to provide logic within each of the stages that maximizes the probability that none of the stages in the pipeline will sit idle and 2) to distribute the tasks among the architected pipeline stages such that no one stage will be the source of a bottleneck in the pipeline. Bottlenecks, or pipeline stalls, cause delays in the execution of application programs.

The first stage of a pipeline microprocessor, the fetch stage, performs the task of retrieving macro instructions from memory devices external to the microprocessor. External memory in a desktop computer system typically takes the form of random access memory (RAM), a device technology that is significantly slower than logic within the microprocessor itself. Hence, to access external memory each time an instruction is required for execution would create an overwhelming bottleneck in the fetch stage. For this reason, a present day microprocessor transfers large blocks instructions from external memory into a smaller, yet significantly faster, memory device that resides within the microprocessor chip itself. This internal memory device is referred to as an instruction cache. The large blocks of memory, known as cache lines, are transferred in parallel bursts rather than one byte at a time, thus alleviating some of the delays associated with retrieving instructions from external memory. Ideally, when an instruction is required for execution, it is desirable to find that the instruction has already been transferred into the instruction cache so that it may immediately be forwarded to the next stage in the pipeline. Finding a requested instruction within the instruction cache is referred to as a cache hit. A cache miss occurs when the requested instruction is not found within the cache and the pipeline must be stalled while the requested instruction is retrieved from external memory. Virtually all present day microprocessors have an on-board instruction cache, the average cache size being approximately 64 KB.

The next stage of a present day pipeline, the translate (or decode) stage, deals with converting a macro instruction into a sequence of associated micro instructions for execution by subsequent stages of the microprocessor. Macro instructions specify high-level operations such as arithmetic operations, Boolean logic operations, and data load/store operations-operations that are too complex to be performed within one given stage of a pipeline. Because of this, the macro instructions are decoded and functionally decomposed by logic in the translate stage into the sequence of micro instructions having sub-tasks which can be efficiently executed within each of the pipeline stages, thus precluding bottlenecks in subsequent stages of the pipeline. Decoded micro instructions are then issued sequentially to the subsequent stages for execution.

The format and composition of micro instructions for a particular microprocessor are unique to that particular microprocessor design and are hence tailored to execute very efficiently on that microprocessor. In spite of this, the translation macro instructions into micro instructions without causing undue pipeline delays persists as a significant challenge to microprocessor designers. More specifically, translation of x86 macro instructions is particularly difficult and time consuming, primarily because x86 instructions can vary from 1 to 15 bytes in length and their opcode bytes (i.e., the bytes that provide the essential information about the format of a particular instruction) can follow up to four optional prefix bytes. One skilled in the art will agree that marking boundaries between macro instructions and designating the bytes containing opcodes is a task that is common to the translation of all macro instructions. This task of determining initial information about macro instructions is referred to as predecoding.

As macro instruction sets continue to grow, exemplified by the addition of MMX® instructions to the x86 instruction set in the late 1990's, the operations (and attendant clock cycles) required to decode these instructions has caused attention to be directed again to overcoming bottlenecks in the translate stage. Consequently, to more evenly balance the operations performed within stages of the pipeline, more recent microprocessor designs have shifted the predecoding operation up into the fetch stage.

There are two techniques used today to predecode macro instructions in the fetch stage. The first technique, employed within the Intel Pentium® II/III series of microprocessors, performs the predecoding operation following retrieval of the bytes of a macro instruction from the instruction cache. Accordingly, predecode logic generates a predecode field corresponding to each byte of the macro instruction and provides these fields along with the bytes in a macro instruction queue. Translation logic then retrieves the instruction bytes and predecode fields from the queue as required. Under some conditions, the time required to perform predecoding in this manner is actually transparent to the pipeline because the translation logic is still able to access bytes from the queue for translation while subsequent bytes are being predecoded. But when the queue is empty, the pipeline must be stalled until predecoding completes.

A second technique for predecoding is believed to be employed within Advanced Micro Device's K6® series of microprocessors. This second technique performs predecoding prior to inserting bytes of a macro instruction into the instruction cache. Accordingly, the time required to predecode instruction bytes is absorbed into the time required to retrieve cache lines from external memory. Predecode information fields corresponding to each instruction byte fetched from memory must then be stored alongside each instruction byte in the instruction cache. Hence, although this second predecoding technique may alleviate potential bottlenecks in the fetch stage, it requires a significantly larger instruction cache than would otherwise be needed.

Neither of the two above techniques sufficiently addresses the predecoding problem. The first approach still can present stalls in the pipeline because predecoding is not performed in parallel with some other function in the fetch stage. The second approach requires a significantly larger cache, which results in more complex and costly parts.

Therefore, what is needed is a predecoding apparatus in a pipeline microprocessor that performs predecoding in parallel with another operation in the fetch stage.

In addition, what is needed is an apparatus in a pipeline microprocessor for predecoding macro instructions that does not require a larger instruction cache to store predecode information.

Furthermore what is needed is a macro instruction predecoder that can predecode bytes as they are provided within an instruction cache yet prior to the time that a cache hit is declared.

Finally, what is needed is a method for predecoding macro instructions within instruction cache logic wherein the predecoding operation is performed in parallel with the operations required to determine whether a cache hit has occurred or not.

SUMMARY OF THE INVENTION

To address the above-detailed deficiencies, it is an object of the present invention to provide predecoding logic that performs predecoding in parallel with another mandatory operation in the fetch stage of a pipeline microprocessor.

Accordingly, in the attainment of the aforementioned object, it is a feature of the present invention to provide an apparatus in a pipeline microprocessor for predecoding macro instructions. The apparatus includes an instruction cache, predecode logic, way selection logic, a translation lookaside buffer, and tag compare logic. The instruction cache stores instruction bytes. The instruction cache has a plurality of cache ways and a plurality of tag arrays. Each of the plurality of tag arrays is coupled to a corresponding cache way, and stores tags within, where specific tags within the each of the plurality of tag arrays denote specific physical page addresses associated with corresponding cache lines within the cache ways. The predecode logic is coupled to the instruction cache. The predecode logic predecodes instruction bytes retrieved from each of the plurality of cache ways, The each of the plurality of cache ways includes cache lines, and the instruction bytes are stored within the cache lines. Low-order bits of a requested linear address are provided to the each of the plurality of cache ways to indicate the instruction bytes. The low-order bits are provided to the plurality of tag arrays to retrieve a corresponding plurality of indexed tags, where each of the plurality of tags are retrieved from a corresponding each of the plurality of tag arrays. The way selection logic is coupled to the predecode logic. The way selection logic provides for translation of a set of said instruction bytes and associated predecode data entities that correspond to one of the each of the plurality of cache ways. The translation lookaside buffer is coupled to the way selection logic. The translation lookaside buffer translates upper address bits of the requested linear address into a requested physical page address. The tag compare logic is coupled to the translation lookaside buffer. The tag compare logic compares the requested physical page address with the corresponding plurality of tags, and selects one of the plurality of tags that matches the requested physical page address, thereby denoting the one of the each of the plurality of cache ways. The tag compare logic directs the way selection logic to provide the set of the instruction bytes and the associated predecode data entities for translation. The predecode logic predecodes the instruction bytes while the translation lookaside buffer converts the upper address bits of the requested linear address into the requested physical page address.

An advantage of the present invention is that the time to predecode macro instructions is transparent to the instruction pipeline.

Another object of the present invention is to provide a pipeline microprocessor predecoding apparatus that determines initial information about macro instructions without requiring a larger instruction cache to store the initial information.

In another aspect, it is a feature of the present invention to provide an instruction predecoding apparatus within a pipeline microprocessor for predecoding bytes of an instruction associated with a next instruction pointer. The predecoding apparatus has a plurality of predecoders, a translation lookaside buffer, select logic, a plurality of tag arrays, and tag compare logic. The plurality of predecoders generates predecode data entities corresponding to each of a plurality of indexed instruction bytes. The plurality of indexed instruction bytes are received from a plurality of cache ways and are indexed by low-order bits of the next instruction pointer. The plurality of cache ways stores the plurality of indexed instruction bytes as cache lines, where each of the cache lines are 32 bytes in length, and where the low-order bits index 16 of the plurality of indexed instruction bytes from each of the plurality of cache ways. The translation lookaside buffer is coupled to the plurality of cache ways. The translation lookaside buffer receives upper bits of the next instruction pointer and translates the upper bits into a physical page number. The select logic is coupled to the plurality of predecoders. The select logic provides a subset of the plurality of indexed instruction bytes and a corresponding subset of the predecode data entities for decoding, where the subset of the plurality of indexed instruction bytes contains the bytes of the instruction and is provided from one of the plurality of cache ways. The plurality of tag arrays stores tags corresponding to the cache lines, where each of the tags within denote a specific physical page number corresponding to a specific cache line, and where the low-order bits are employed to retrieve indexed tags. Each of the indexed tags is retrieved from a corresponding each of the plurality of tag arrays. The tag compare logic is coupled to the translation lookaside buffer. The tag compare logic compares the physical page number with the indexed tags, and designates that the subset of the plurality of indexed instruction bytes comes from the one of the plurality of cache ways. The tag compare logic directs the select logic to provide the subset of the plurality of indexed instruction bytes and the corresponding subset of predecode data entities for translation. The plurality of predecoders predecode the indexed instruction bytes in parallel with the translation of the upper address bits of the next instruction pointer into the physical page number.

Another advantage of the present invention is that pipeline delays due to predecoding can be precluded without significantly increasing the complexity, power consumption, or cost of a microprocessor.

A further object of the present invention is to provide a macro instruction predecoder that can predecode bytes as they are provided within an instruction cache yet prior to the time that a cache hit is declared.

In a further aspect, it is a feature of the present invention to provide a pipeline microprocessor that determines associated initial information about bytes of an instruction prior to translating the instruction into associated micro instructions. The pipeline microprocessor includes an instruction cache and TLB logic. The instruction cache stores the instruction. The instruction cache includes cache ways, instruction predecoding logic, a mux, and tag arrays. The cache ways store cache lines retrieved from memory, where the bytes of the instruction are stored within a specific indexed cache line within a specific cache way, and where the specific indexed cache line is one of a plurality of indexed cache lines taken from each of the cache ways. The instruction cache comprises four of the cache ways, and each of the cache ways stores 512 of the cache lines. The instruction predecoding logic is coupled to the cache ways, and determines initial information concerning each of the plurality of indexed cache lines. The mux is coupled to the instruction predecoding logic. The mux selects the specific cache way, and provides the bytes of the macro instruction, along with corresponding specific initial information bytes for translation. The tag arrays are each configured to store tags associated with each of the cache lines. The TLB logic is coupled to the instruction cache. The TLB logic translates a linear address corresponding to the macro instruction into a physical page address, and directs the mux to select the specific cache way. The TLB logic compares the physical page address to indexed tags taken from each of the tag arrays to determine which of the cache ways contains the bytes of the instruction. The TLB logic directs the mux to provide the bytes of the instruction along with the associated initial information for translation. The instruction predecoding logic determines the initial information while the TLB logic translates the linear address.

Yet a further object of the present invention is to provide a method for predecoding macro instructions within instruction cache logic wherein the predecoding operation is performed in parallel with the operations required to determine whether a cache hit has occurred or not.

In yet a further aspect, it is a feature of the present invention to provide a method for predecoding macro instructions in a pipeline microprocessor. The method includes retrieving a indexed cache line bytes from each of a plurality of cache ways; translating a linear address into a requested physical page address; in parallel with the translating, predecoding the indexed cache line bytes to generate corresponding bytes of predecode information; and providing for instruction decoding, a subset of the indexed cache line bytes and a subset of the corresponding bytes of predecode information.

Yet a further advantage of the present invention is that predecoding can be performed in parallel with cache hit determination operations without a requirement to store predecode data within an instruction cache.

BRIEF DESCRIPTION OF THE DRAWINGS

These and other objects, features, and advantages of the present invention will become better understood with regard to the following description, and accompanying drawings where.

DETAILED DESCRIPTION

In light of the above background on techniques for predecoding macro instructions prior to their translation within a pipeline microprocessor, several related art examples will now be discussed with reference to FIGS. 1 through 3. These examples illustrate the problematic nature of present day predecoding techniques and apparatus. When predecoding is performed following selection and retrieval of a cache line from an instruction cache, additional clock cycles are required to perform the predecoding operation. On the other hand, predecoding cache lines prior to inserting them into the instruction cache requires that the instruction cache be significantly larger in order to additionally store the predecode information that corresponds to each byte within a cache line. Following this discussion, a detailed description of the present invention will be provided with reference to FIGS. 4 through 7. The present invention overcomes the limitations of these two prevailing predecoding techniques by providing an apparatus and method for predecoding cache lines following their retrieval from the cache ways within an instruction cache yet prior to selection of a specific cache way, i.e., prior to when a cache hit is declared. The predecoding is performed in parallel with linear-to-physical address translation that is typically executed by translation lookaside buffer logic. Address translation must be performed each time an instruction cache is accessed to determine whether there is a cache hit or not.

Figure 1:
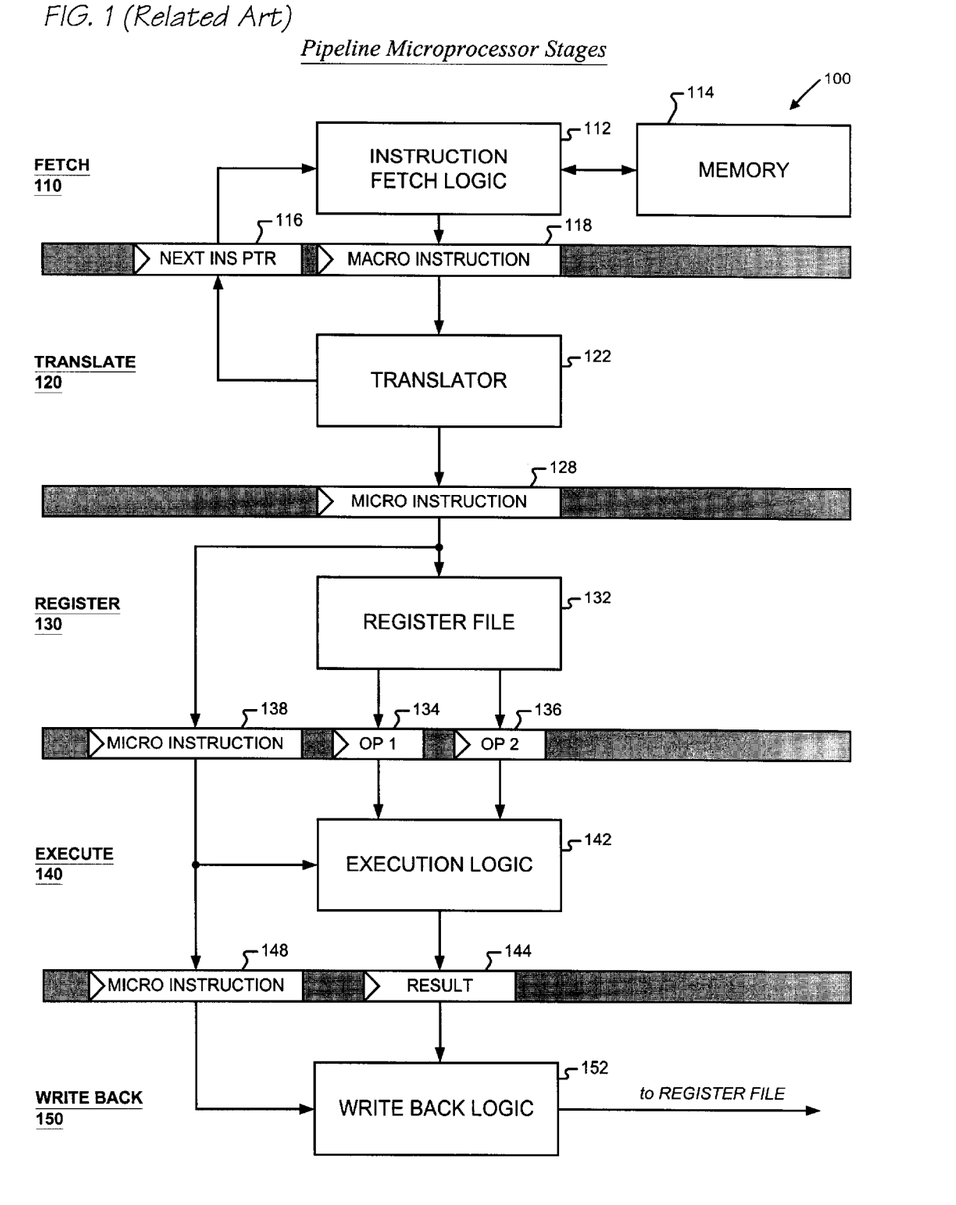
FIG. 1 is a block diagram illustrating stages of a related art pipeline microprocessor.

Referring to FIG. 1, a block diagram is presented illustrating stages of a related art pipeline microprocessor 100. The microprocessor 100 has a fetch stage 110, a translate stage 120, a register stage 130, an execute stage 140, and a write back stage 150. The fetch stage 110 has instruction fetch logic 112 that accesses macro instructions from memory 114. The fetch logic 112 outputs the instructions to a macro instruction buffer 118. The translate stage 120 has a translator 122. The translator 122 is also known as translation logic 122, a decoder 122, or an instruction decoder 122. The register stage 130 has a register file 132 providing outputs to operand registers 134, 136. The execute stage 140 includes execution logic 142 that accesses the operand registers 134, 136 and that provides an output to a result register 144. The write back stage 140 includes write back logic 152. The write back logic 152 interfaces to both the result register 144 and the register file 132.

In operation, the fetch stage 110 fetches the macro instructions from the memory 114 that are to be executed by the microprocessor 100. The macro instructions are typically provided in sequence, one at a time, to the macro instruction buffer 118. The translation logic 122 translates, or decodes, each of the fetched macro instructions into associated micro instructions, each of the associated micro instructions directing logic within subsequent stages 130–150 of the microprocessor 100 to perform a specific subtask related to accomplishment of an operation prescribed by a corresponding macro instruction. Micro instructions are provided in sequence to the register stage 130 via a micro instruction buffer 128. A typical micro instruction may prescribe operands that are stored in particular registers within the register file 132 for use by latter stages 140–150. Within the register stage 130, the operands are retrieved from the register file 132 and are provided to the execute stage 140 via the operand registers 134, 136. Micro instructions are forwarded to the execute stage 140 via buffer 138. Within the execute stage 140, micro instructions direct the execution logic 142 to perform specified subtasks using the operands provided via the operand registers 134, 136 or using other provided operands (not shown). Examples of typical specified subtasks are arithmetic functions and Boolean logic functions. The execution logic 142 performs a prescribed subtask and places a result in the result register 144. Micro instructions are forwarded to the write back stage 150 via buffer 148. Micro instructions may also specify a destination register within the register file 132 where the result is to be stored. Hence, the write back logic 152 accesses both the result register 152 and buffer 148 to write the result register contents to a prescribed destination register in the register file 132. Once a micro instruction has executed through the write back stage 150, it has completed execution.

A present day pipeline microprocessor 100 is purposely designed to execute sequentially stored instructions more efficiently than non-sequentially stored instructions. Sequentially stored instructions are macro instructions that are stored in sequential memory locations. One of the architectural features that provides for this efficient execution is a next sequential instruction pointer (NSIP), also referred to as a next instruction pointer (NIP). As the name implies, the next instruction pointer points to the location, or address, in memory 114 of the next sequential instruction that is to be executed by the microprocessor 100. In order to fetch the next sequential instruction from its address in memory 114, the translator 122 updates a next instruction pointer register 116 by incrementing or decrementing the memory address within the register 116 by the length in bytes of a currently executing instruction, thus prescribing the address of the next instruction to be executed. Consequently, the efficient flow of instructions for execution by the microprocessor 100 is accomplished by merely adjusting the contents of the register 116.

The use of a next instruction pointer within the microprocessor 100 does not imply that application programs must be comprised entirely of sequential instructions. The microprocessor 100 is quite capable of executing non-sequential instructions as well. But executing non-sequential instructions, or jumps, is significantly less efficient than executing instructions in sequence. In addition to the next instruction pointer, there are many other techniques employed within the art to expedite execution of sequential instructions. Consequently, many application programs today are expressly designed to maximize the execution of sequential code and to minimize the number of jumps.

Instructions move through the stages 110–150 of the microprocessor pipeline in synchronization with a microprocessor clock (not shown), very much like an item of manufacture moves through an assembly line. So optimally, while a given stage in the pipeline is executing a given instruction, the previous stage should be executing a subsequent sequential instruction and the next stage should be executing a preceding sequential instruction. But, if the given stage in the pipeline requires more than one cycle of the pipeline clock to execute a given instruction, then flow of instructions through the microprocessor pipeline is temporarily stalled until the given instruction completes execution within the given stage. Consequently, when an application program prescribes a jump to a non-sequential next instruction, rather than simply adjusting the NSIP, logic in the translate stage 120 must stall the pipeline for some number of cycles in order to determine the target address of the non-sequential next instruction. Stalling the pipeline within any of the stages 110–150 causes delays that can negatively affect the performance of an application program as it executes on the microprocessor 100.

One skilled in the art will appreciate that the example discussed above with reference to FIG. 1 is a very general-albeit representative-portrayal of the pipeline stages 110–150 within a present day microprocessor 100. There are many pipeline architecture variations extant in the art that exhibit differing numbers of stages, different decompositions of the discussed operations into different logic elements, or even the addition of logic within some stages for the execution of some instructions in parallel. Yet in spite of the variations in pipeline architecture, one skilled in the art will concur that even the most complex pipeline microprocessor 100 must perform the general pipeline functions described above. In view of this, one of the principal objectives of a microprocessor designer is to decompose these general functions into a balanced set of sub-functions such that the majority of instructions require roughly the same number of clock cycles to execute within each of the stages 110–150. Of course, the ultimate goal is that a microprocessor pipeline architecture support 1-cycle execution of all instructions within each stage 110–150. If this ultimate goal were to be achieved, then stalls would virtually never occur and this "ideal" microprocessor would be operating at 100 percent efficiency.

Idealism notwithstanding, a present day microprocessor 100, in addition to being capable of efficiently executing a present day application program, must also be capable of executing previously developed application programs, or legacy code. In fact, providing the ability to execute legacy code, along with providing support for other legacy features, constitutes one of the most significant challenges that face microprocessor designers. Hence, while an alternative staging design for a microprocessor 100 may provide for very efficient execution of newer application programs, in order to support legacy features, the stages 110–150 shown in FIG. 1, rather than being completely revamped, are typically fine-tuned, that is, they are each enhanced and improved upon with each new revision of a microprocessor 100. One example of fine-tuning a given stage is to add logic to the given stage whose express function is to preclude the occurrence of pipeline stalls within that stage.

Perhaps the most challenging bottlenecks in the instruction pipeline occur with the first two stages: the fetch stage 110 and the translation stage 120. This is because these are the only two stages 110, 120 in the pipeline that must physically process with legacy code; the remaining stages 130–150 execute micro instructions that are typically unique to a particular microprocessor 100 design and are thus tailored for efficient execution within those stages 130–150. This scenario can be no better illustrated than by observing the number and distribution of legacy application programs that persist in the desktop computer area. Today, there are literally hundreds of application programs on the market, with some dating all the way back to the early 1980's. And more than half of these programs employ macro instructions conforming to the x86 instruction set architecture (ISA)-an ISA that was developed prior to the advent of pipeline microprocessors 100.

With respect to more advanced pipeline microprocessors 100, the x86 ISA is deficient for two reasons: 1) x86 macro instructions vary in length from one byte to 15 bytes, and 2) many macro instructions can have up to four prefix bytes added to modify the basic operation prescribed. It is obvious to one skilled in the art that the flow of macro instructions through the fetch 110 translate 120 stages would be much more easily and efficiently accomplished were all macro instructions to be of a fixed number of bytes. But this is not the case. In addition to the latency problems encountered in retrieving instructions from slower memory devices 114, the issues associated with determining initial information about macro instructions, such as where one instruction ends and the next instruction starts, continue to plague the art. This application focuses on techniques for overcoming problems related to determining this initial information about macro instructions.

Figure 2:
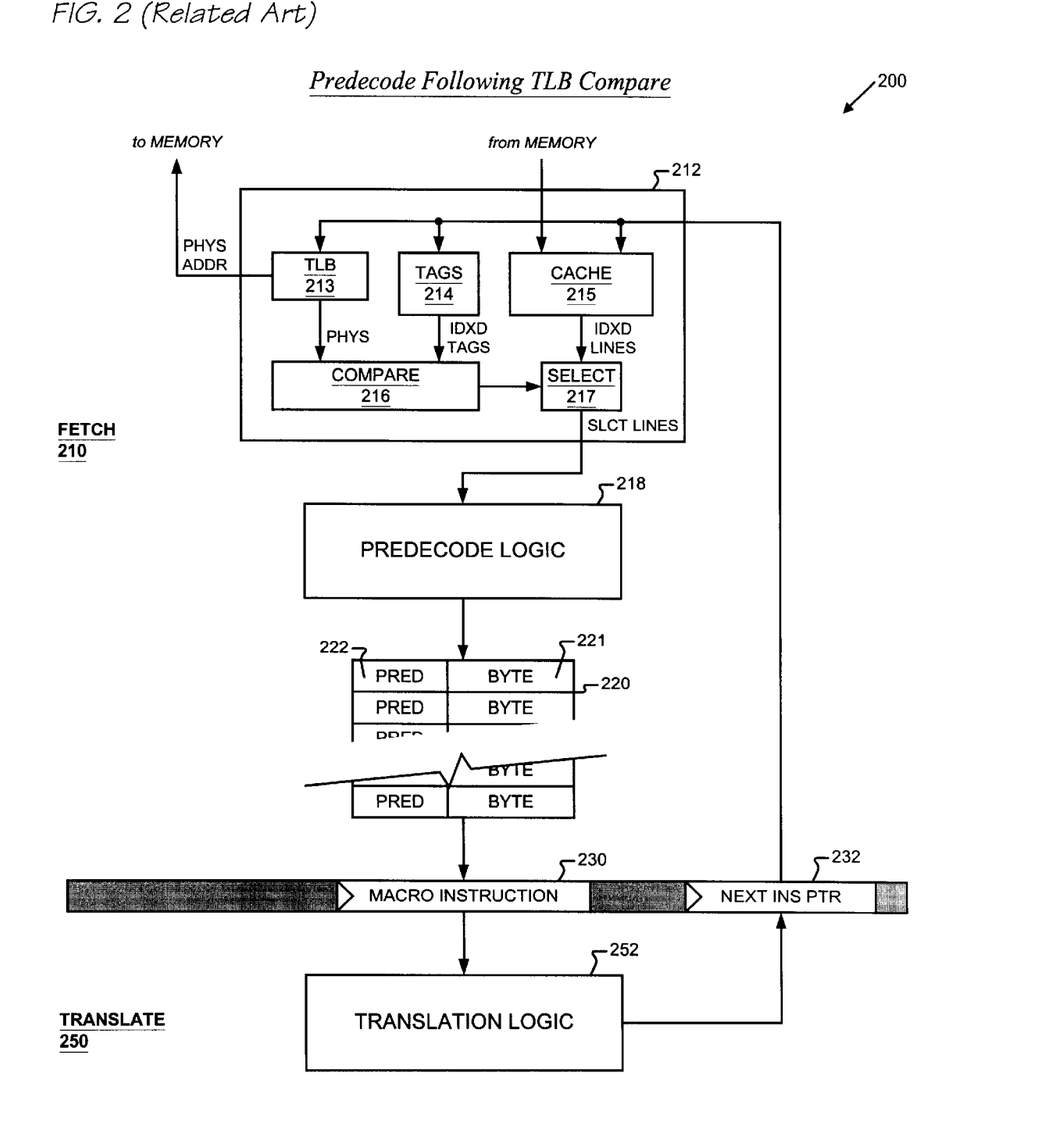
FIG. 2 is a block diagram depicting a related art technique for predecoding macro instructions following retrieval of the macro instructions from an instruction cache.

Now referring to FIG. 2, a block diagram 200 is presented depicting a related art technique for predecoding macro instructions following retrieval of the macro instructions from an instruction cache. The block diagram 200 shows the first two stages of a present day pipeline microprocessor: a fetch stage 210 and a translate stage 250. In addition, the block diagram 200 depicts logic that corresponds to sub-functions performed within the fetch stage 210 to overcome delays associated with fetching macro instructions from memory (not shown) and to determine initial information about these macro instructions. Determining initial information about a macro instruction is known as predecoding the macro instruction. The fetch stage 210 includes instruction fetch logic 212, predecode logic 218, and a macro instruction queue 220. The instruction fetch logic 212 has an instruction cache 215, a tag array 214, a translation lookaside buffer (TLB) 213, tag compare logic 216, and select logic 217. Like the microprocessor 100 of FIG. 1, macro instructions are provided from the fetch stage 210 to the translate stage 250 via a macro instruction buffer 230 and similarly, the translate stage 250 of. FIG. 2 has translation logic 252 that modifies a next instruction pointer register 232. The contents of the next instruction pointer register 232 are provided to the instruction fetch logic 212, thereby prescribing the address of the next instruction for execution by the microprocessor.

The features illustrated within the fetch stage 210 are dedicated to overcoming problems associated with slips in the pipeline. First, the instruction cache 215 provides a means whereby anticipated macro instructions can be rapidly accessed from within the instruction fetch logic 212 itself rather than incurring delays caused by having to fetch these instructions from slower, external memory devices. Second, the predecode logic is included to determine initial information about macro instructions that are scheduled for execution. As alluded to above, this initial information may include instruction length and prefix information, but may as well include designations for instructions that require special execution logic such as floating point instructions. The initial information is determined by the predecode logic 218 and accompanies bytes of a macro instruction as the bytes are placed into the macro instruction queue 220. Hence, each entry in the queue 220 has a byte field 221 and a corresponding predecode data field 222. Predecoding instructions in the fetch stage 210 transfers some of the operations that would otherwise be performed by translation logic 252 to logic 218 in the fetch stage 210. Translation of macro instructions into associated micro instructions is perhaps the most complex and time consuming function performed within present day pipeline microprocessors; to perform predecoding functions as well as decoding functions within the translate stage 250 would result in severe bottlenecks. Third, the macro instruction queue 220 is provided to allow a translator 252 to access instructions for translation during those times when the instruction fetch logic 212 is waiting on memory to transfer a block of instructions to the cache 215.

The sub-functions and attendant logic shown in the block diagram 200 represent one of the two prevailing techniques employed to determine initial information about macro instructions that are scheduled for execution by a pipeline microprocessor.

As was alluded to above, a present day microprocessor uses an instruction cache 215 to overcome the delays associated with fetching instructions from memory. An instruction cache 215 is a very fast memory device that is part of the microprocessor itself. Because it is part of the microprocessor, entries within the cache 215 can be accessed much faster than conventional memory external to the microprocessor. But the cache 215 does not entirely duplicate main memory on-chip; rather, it is much smaller in size. Because of this, one of the primary functions of the instruction fetch logic 212 is to maintain blocks of instructions within the cache 215 that have a high probability of being executed by the microprocessor. Accordingly, cache maintenance algorithms are employed by the instruction fetch logic 212 to transfer these blocks of instructions from memory to the cache 215 prior to the time when instructions within the blocks are required for execution.

Under ideal conditions, the contents of the memory address prescribed by the contents of the next instruction pointer register 232 are already resident within the cache 215, having been previously transferred from memory. When a requested instruction is found within the cache 215, it is referred to as a cache "hit." A cache "miss" refers to the situation where the requested instruction prescribed by the NSIP is not found within the cache 215. When a cache miss occurs, the instruction fetch logic 212 must retrieve the requested instruction from memory rather than from the cache 215, causing a stall in the pipeline.

But as noted above, upon a miss the instruction fetch logic 212 does not transfer instructions from memory to the cache 215 individually. Instead, larger blocks of instructions called cache lines are transferred. Cache lines are typically 16, 32, or 64 contiguous bytes of memory. Thus, when a cache miss occurs, the instruction fetch logic 215 transfers an entire cache line that contains the location addressed by the NSIP from memory to the cache 215. And since most application programs are designed to execute sequential instructions, it is highly probable then that the next few following instructions for execution will already be in the cache 215 as a result of the transfer that resulted from the cache miss.

Rather than being a single memory array, a cache 215 typically is divided into two or more equally sized arrays called cache ways (not shown). Each cache way holds a fixed number of cache lines, the cache lines being indexed by low-order bits of the NSIP. For example, in an instruction cache 215 composed of two 512-entry cache ways having 32-byte cache lines, bits 13:5 of the NSIP would be used to uniquely index one cache line within each of the two cache ways. Bits 4:0 of the NSIP would distinguish individual bytes within each of two indexed cache lines. And although low-order bits are used to index each of the cache ways, the upper bits of the memory address corresponding to each of the two indexed cache lines are required to distinguish the contents of one cache way from the other cache way. For example, in a microprocessor having 32-bit addresses, the two indexed cache lines are distinguished by also storing the upper 20 bits (i.e., bits 31:14) of their memory addresses. These upper address bits, or tags, are stored in the tag array 214, which is partitioned and indexed in the same manner as the instruction cache 215. Hence, a two-way cache 215 having 512 cache lines per cache way would have two corresponding 512-entry tag ways. One of the tag ways would contain tags corresponding to one of the cache ways and the other tag way would contain tags corresponding to the other cache way. Hence, when an NSIP is issued to the instruction fetch logic 212, its low-order bits index all of the cache ways in the instruction cache 215 and all of the tag ways in the tag array 214. The cache ways provide a number of cache lines corresponding to the number of cache ways to the select logic 217 and the tag array 214 provides the same number of corresponding tags to the compare logic 216. The indexed cache line whose corresponding tag contains the upper address bits of the requested instruction's memory address contains the requested instruction.

To select a cache line, however, is not so simple as comparing the upper bits of the NSIP to a plurality of indexed tags. This is because most present day microprocessors employ a virtual addressing scheme for accessing external memory and other external devices (not shown). Within a virtual addressing scheme, the contents of the NSIP are referred to as a linear address and a memory address is referred to as a physical address. To determine the physical address in memory of an instruction whose linear address is prescribed by the NSIP first requires a translation of the linear address to a physical address. An in-depth discussion of virtual addressing is quite beyond the scope of this application, other than to note that to access a location in memory always requires that address translation determine a corresponding physical address of the location. Translation of a linear address to a physical address is the function of the translation lookaside buffer 213. Typically, upper bits of a given linear address in the NSIP register 232 are translated by the TLB 213 into upper bits of a corresponding physical address; the low-order bits of the linear address and physical address are the same. And although it is the function of the TLB 213 to perform the linear-to-physical address translation, it does so by accessing tables of data in external memory called page directories and page tables. The page directories and page tables are established by an application program executing on the microprocessor and contain the mappings required to perform the address translation. Hence, the tags stored in each of the tag ways are not the upper bits of linear addresses; they are the upper bits of physical addresses, sometimes referred to as physical page numbers.

From the standpoint of this application, one skilled in the art will appreciate that each time an NSIP is used to index into an instruction cache 215 and tag array 214, to determine if there is a cache hit, the TLB 213 must first translate the upper bits of the NSIP to a corresponding physical page number, or physical tag, which is then compared to indexed tags retrieved from indexed entries in each of the tag ways. The compare logic 216 compares each of the indexed tags to the translated physical page number. If one of the indexed tags matches the translated physical page number, then a hit is declared: the cache way corresponding to the tag way that produced the matching tag contains the requested instruction. Consequently, the compare logic 216 directs the select logic 217 to forward the indexed cache line containing the requested instruction from the cache way that corresponds to the matching tag to the predecode logic 218. If none of the indexed tags match the translated physical page number, then a miss is declared and external memory must be accessed to retrieve the cache line containing the requested instruction.

There are a number of other details related to the operation of a present day instruction cache 215 that are beyond the scope of this application and hence, are not presented in the block diagram 200. One skilled in the art will appreciate that logic (not shown) must be provided to indicate the validity of data within each of the cache ways, logic (not shown) is necessary to ensure that older cache lines are replaced by more recently used cache lines, etc. It is sufficient herein to note that linear-to-physical address translation by a TLB 213 is a function that must be performed each time an NSIP is provided to the instruction fetch logic 212. And while the cache ways and tag ways are merely indexed by low-order bits of the NSIP to retrieve a plurality of cache lines and corresponding tags, translation of the linear address upper bits to a physical page number is substantially more complex, sometimes requiring access to several tables in external memory. The present inventors have observed that address translation is the most time consuming function performed by instruction fetch logic 212; tag and cache line retrieval occurs much faster.

Once a cache line containing the requested instruction has been forwarded by the select logic 217, the predecode logic 218 then examines each byte of the cache line to determine initial information about each of instructions within the cache line. As noted above, in the x86 area, the most critical piece of initial information about instructions is where one instruction ends and where the next instruction begins, in other words, the length of instructions. By having an indication of the length of an instruction provided along with a byte of the instruction, the translation logic 252 can be provided with the proper number of bytes to allow expeditious translation of a macro instruction into associated micro instructions. Accordingly, the predecode logic 218 generates predecode information for each byte of a cache line. This predecode information is written to the instruction queue 220 in the predecode field 222 along with each byte of a cache line that is written to a corresponding byte field 221.

There are many different predecode field formats employed to provide initial information concerning bytes of a cache line, but the logical operations performed by the predecode logic 218 are fairly consistent across the spectrum of x86-compatible microprocessors. The examination of instruction bytes to determine initial information about x86 instructions is a complex task that involves searching for bytes having values that indicate certain prefixes and opcodes; searching for bytes that indicate opcode extensions, immediate fields, mod r/m fields; and searching for other attributes that are used to determine other instruction characteristics. A comprehensive discussion of the specifics of instruction predecoding depart from the scope of this application. It is adequate herein to mention that the result of predecoding is most often a predecode information field 222 that accompanies each byte 221 of an instruction as it is provided for translation. The predecode fields 222 are invaluable to the translation logic 252 in that macro instructions can be more expeditiously decoded into associated micro instructions because this initial information has been previously determined by logic 218 within the fetch stage 210.

The post-TLB compare technique shown in the block diagram 200 for predecoding instructions is straightforward because only those bytes that are actually scheduled for translation get predecoded. But since the predecode logic 218 is a single link in the pipeline chain, it follows then that clock cycles must be dedicated to performing the predecode functions. But due to the presence of the instruction queue 220, there may very well be instances when this predecoding can remain transparent to the subsequent translation stage 250, such as when the instruction queue 220 is already full during the predecoding of a following cache line. Under this scenario, the translator 252 can continue to access instruction bytes 221 and predecode bits 222 without experiencing a stall. However, when the instruction queue 220 is empty, then the translator 252 must stall until predecoding is accomplished.

Figure 3:
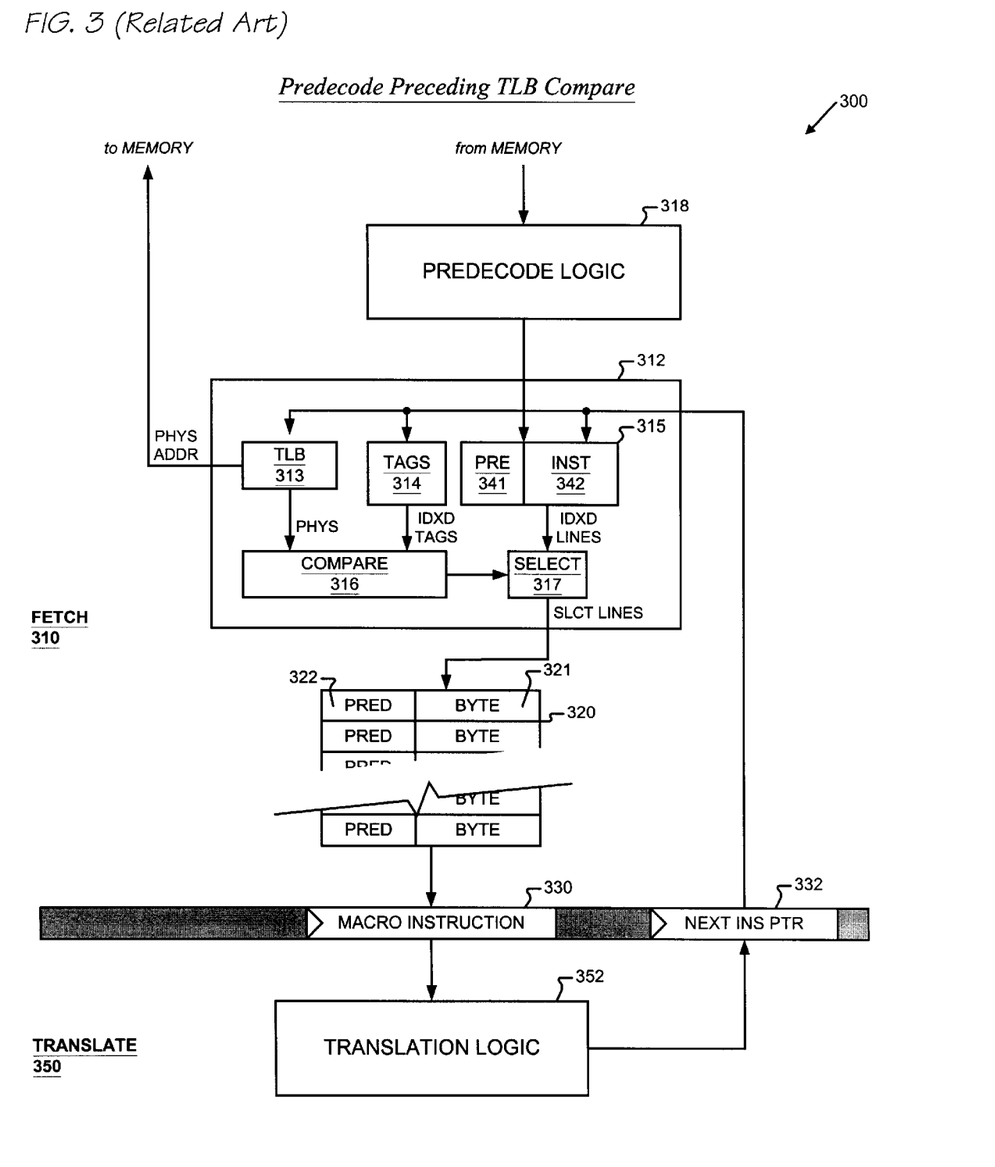
FIG. 3 is a block diagram illustrating a related art technique for predecoding macro instructions prior to loading the macro instructions into an instruction cache.

Now referring to FIG. 3, a block diagram 300 is presented illustrating a related art technique for predecoding macro instructions prior to transferring the macro instructions into an instruction cache 315. The block diagram 300 shows the first two stages of a present day pipeline microprocessor: a fetch stage 310 and a translate stage 350. Like the stages 210, 250 discussed with reference to FIG. 2, the block diagram 300 of FIG. 3 depicts logic that corresponds to sub-functions performed within the fetch stage 310 to overcome memory access delays and to perform predecoding of instruction bytes. The fetch stage 310 includes predecode logic 318, instruction fetch logic 312, and a macro instruction queue 320. The instruction fetch logic 312 has an instruction cache 312, a tags array 314, a translation lookaside buffer (TLB) 313, tag compare logic 316, and select logic 317. Macro instructions are provided from the fetch stage 310 to the translate stage 350 via a macro instruction buffer 230. The translate stage 350 has translation logic 352 that adjusts a next instruction pointer register 332. The contents of the next instruction pointer register 332 are provided to the instruction fetch logic 312, thereby prescribing the address of the next instruction for execution by the microprocessor.

Operationally, logic elements within the stages 310, 350 of FIG. 3 function similar to like-numbered elements within the stages 210, 250 of FIG. 2, the hundreds digit being replaced with a 3. The fetch stage architecture of FIG. 3 is however quite distinct from that of FIG. 2 in that the predecode logic 318 precedes the instruction fetch logic 312. Consequently, cache lines are predecoded as they are retrieved from memory (not shown) and prior to their insertion into the instruction cache 315. This technique, removes the predecoding function from the primary instruction fetch chain, and more closely aligns it with memory accesses, which often occur in bursts that are asynchronous to other operations in the fetch stage 310. Hence, in addition to requiring clock cycles to perform the predecode function on each incoming byte of a cache line, the predecoding technique depicted in FIG. 3 requires an instruction cache 315 that is much bigger than the instruction cache 215 of FIG. 2. This is because the instruction cache 315 of FIG. 3 must also store predecode information corresponding to each byte of the cache lines that are stored therein.

To put the example of FIG. 3 into practical terms, the microprocessor employs a 6-bit predecode field corresponding to each byte of a cache line. If one partitions an instruction cache into a predecode partition 341 and an instruction byte partition 342, then under this predecoding approach it follows that almost half of the cells in the instruction cache 315 are required to hold predecode information. From an alternate viewpoint, cache size must be increased by 75 percent to utilize the predecoding technique depicted in FIG. 3. Accordingly, a microprocessor such as this dedicates 32 KB of cache space to instruction bytes 342 and 20 KB of cache space to predecode fields 341.

The examples discussed with reference to FIGS. 1 through 3 clearly illustrate the limitations of present day predecoding techniques and apparatus. Under one technique predecoding becomes a potentially time consuming part of the primary instruction fetch and translation chain. Under the other approach, potential predecoding delays can be perhaps absorbed within the cycles required to perform a block memory transfer, but to provide this benefit requires an instruction cache 315 that is almost twice the size of the cache 215 employed under the first approach. One skilled in the art will acknowledge that real-estate on a pipeline microprocessor integrated circuit comes at a premium. Increasing the size of an already significant element of the microprocessor adds complexity to the design, it requires much more power to operate, and lowers the overall reliability of the part. Each of these three factors translates to increased cost.

It is desirable to provide a technique whereby the cycles required to predecode instruction bytes can be absorbed into the time required to perform some other mandatory operation, but without exhibiting the negative attributes of a large instruction cache 315. As was alluded to above, the present inventors have observed that one of the mandatory operations performed within the fetch chain 310 of a present day microprocessor-linear-to-physical address translation by a TLB-takes noticeably longer to perform than the parallel cache/tag indexing functions. Accordingly, a predecoding apparatus and method are provided herein that advantageously exploit this attribute of instruction fetch logic within a pipeline microprocessor.

The present invention overcomes the limitations of the two prevailing techniques for predecoding macro instructions by providing an apparatus and method for predecoding indexed cache lines in parallel with address translation by a TLB. The present invention is more specifically discussed with reference to FIGS. 4 through 7.

Figure 4:
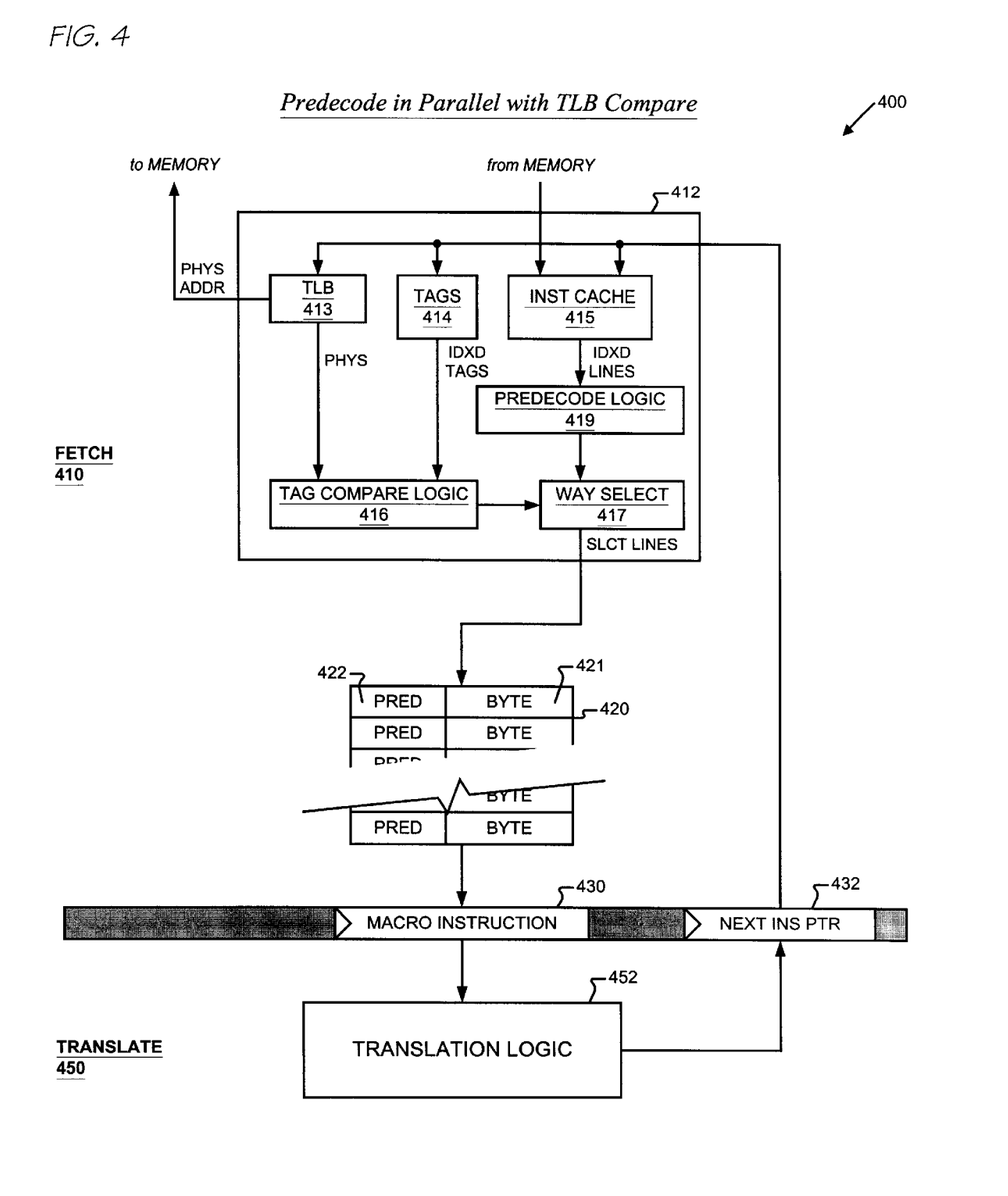
FIG. 4 is a block diagram of a microprocessor according to the present invention for predecoding indexed cache lines in parallel with translation lookaside buffer tag comparison.

Referring to FIG. 4, a block diagram is presented depicting a microprocessor 400 according to the present invention for predecoding indexed cache lines in parallel with translation lookaside buffer tag comparison. The microprocessor 400 includes a fetch stage 310 and a translate stage 350. For clarity of discussion, register, execute, and write back stages are not shown in the block diagram. Like the stages 210, 310, 250, 350 discussed with reference to FIGS. 2 and 3, the microprocessor 400 according to the present invention depicts logic that corresponds to sub-functions performed within the fetch stage 410 to overcome memory access delays. The fetch stage 410 includes instruction fetch logic 412, and a macro instruction queue 420. The instruction fetch logic 412 has an instruction cache 412, a tag array 414, a translation lookaside buffer (TLB) 413, tag compare logic 416, and way select logic 417. Macro instructions are provided from the fetch stage 410 to the translate stage 450 via a macro instruction buffer 430. The translate stage 450 has translation logic 452 that adjusts a next instruction pointer register 432. The contents of the next instruction pointer register 432 are provided to the instruction fetch logic 412, thereby prescribing the address of the next instruction for execution by the microprocessor. In contrast, however, to the examples discussed with reference to FIGS. 2 and 3, the microprocessor 400 according to the present invention includes predecode logic 419 as part of the instruction fetch logic 412. The predecode logic 419, or predecoder 419, receives indexed cache lines from the instruction cache 415 and provides its outputs to the way select logic 417.

Operationally, logic elements within the stages 310, 350 of FIG. 3 function similar to like-numbered elements within the stages 210, 310, 250, 350 of FIGS. 2 and 3, the hundreds digit being replaced with a 4. The fetch stage architecture of the present invention, however, is quite different from that of FIGS. 2 and 3 in that predecoding is performed in parallel with address translation by the TLB 413 and tag comparison by the tag compare logic 416. Within instruction fetch logic 412 according to the present invention, indexed cache lines are predecoded as they are retrieved from the instruction cache 415 during the time that the TLB 413 is translating a linear address to a physical address and prior to declaration of a cache hit by the compare logic 416. Hence, the time required to predecode the indexed cache lines is absorbed within the time required for address translation. The predecode logic 419 according to the present invention, however, differs from that 218, 318 discussed with respect to FIGS. 2 and 3 in that indexed cache lines from each of the cache ways (not shown) within the instruction cache 415 are predecoded in parallel to produce predecode fields corresponding to each byte within each of the cache lines. And although a number of cache lines corresponding to the number of ways within the cache 415 are predecoded by the predecode logic 419, only one of the cache lines and corresponding set of predecode fields are forwarded to the macro instruction buffer 420 by the way select logic 417 when a hit occurs. The predecoding approach according to the present invention is superior to the present day techniques presented with reference to FIGS. 2 and 3 because it allows for predecoding to be absorbed into the time required to perform a mandatory parallel function (i.e., address translation), yet it does not require a large instruction cache.

Figure 5:
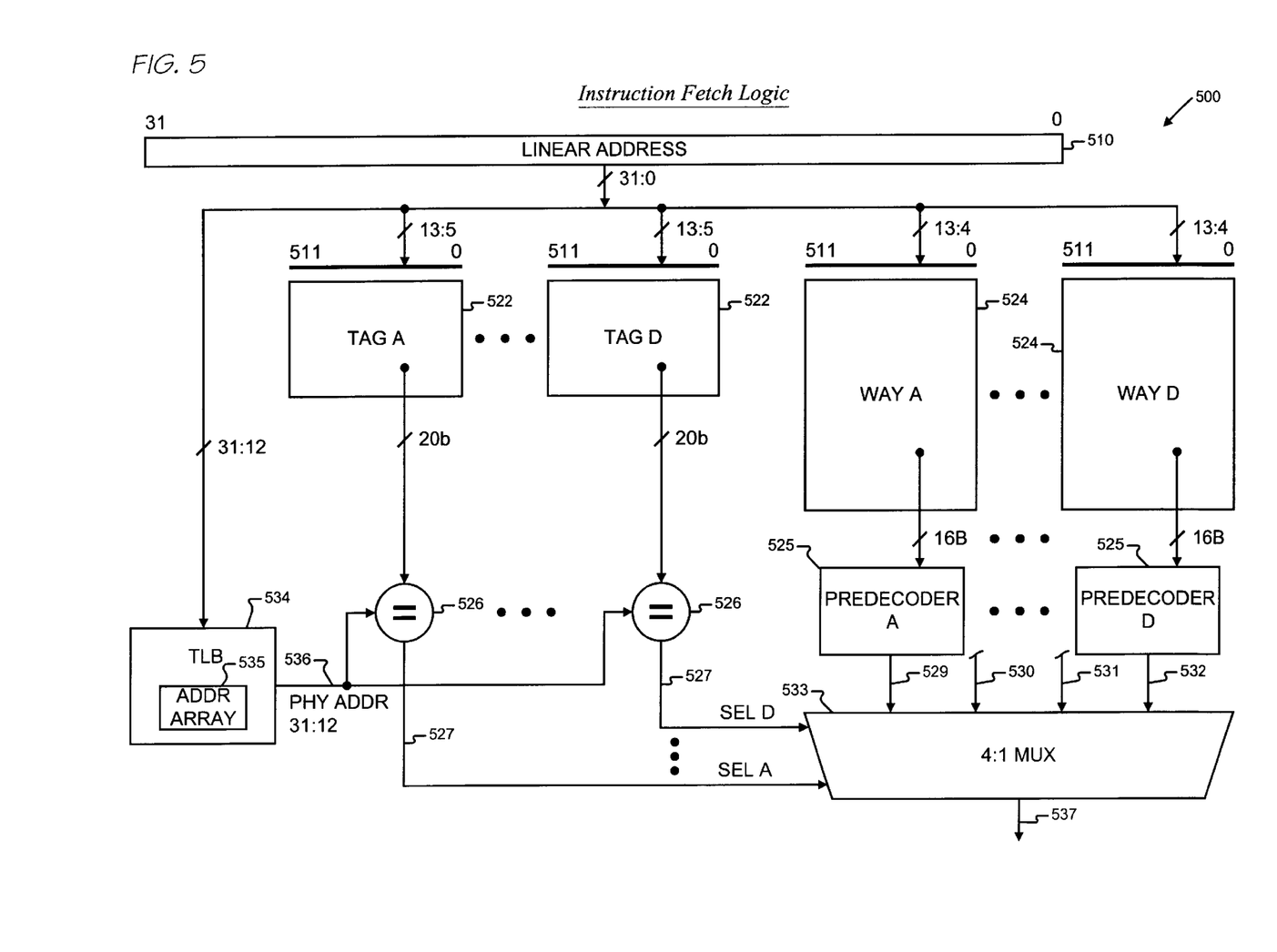
FIG. 5 is a block diagram illustrating instruction fetch logic according to a 4-way instruction cache embodiment of the present invention.

Now referring to FIG. 5, a block diagram is presented illustrating instruction fetch logic 500 according to an embodiment of the present invention having a 4-way instruction cache. The instruction fetch logic 500 receives a 32-bit linear address from a next sequential instruction pointer register 510. Bits 13:4 of the linear address are provided to index into four 512-entry cache ways 524, each of the plurality of cache ways having 32-byte cache line entries (not shown). Indexed bytes from each of the four cache ways 524 are output to a corresponding number of predecoders 525. The four predecoders 525 provide outputs to way selection logic 533 via buses 529–532. In one embodiment, the way selection logic 533 is a 4:1 mux 533. The instruction fetch logic 500 has four 512-entry tag ways 522 corresponding to each of the four cache ways 524. Bits 13:5 of the NSIP register 510 are used to index tag entries in each of the four tag ways 522. Each of the tag ways 522 provide a 20-bit tag entry output to compare logic 526. In addition, bits 31:12 of the linear address are provided to a translation lookaside buffer 534. The TLB 534 has an internal address array 534 that stores the most recently translated physical page numbers. In one embodiment, the address array 534 stores 128 recently translated page numbers. The TLB 524 outputs bits 31:12 of a 32-bit physical address via bus 536 to each of the plurality of compare logic devices 526. Each of the compare logic devices 526 output a select signal 527 to the way selection logic 533. The way selection logic 533 provides selected cache line bytes along with corresponding predecode information for translation via bus 537. operationally, 32-byte cache lines reside within each of the entries in each of the cache ways 524. But in the embodiment shown in FIG. 5, bit 4 of the linear address is also used to index further down to one of two 16-byte sub-lines that make up a cache line. Hence, when indexed, each of the cache ways 524 provides a 16-byte sub-line for predecoding. Each of the predecoders 525 predecode a corresponding 16-byte sub-line and generate 16 predecode fields for each byte within the 16-byte sub-line. The indexed sub-lines along with their corresponding predecode fields are routed to the way selection logic via buses 529-532.

In one embodiment, the TLB 534 performs linear-to-physical address translation in accordance with the x86 architecture, thereby translating bits 31:12 of the linear address into bits 31:12 of a physical address. If the address array 535 contains an entry corresponding to bits 31:12 of the linear address, then bits 31:12 of the physical address, i.e., the requested physical page number, is retrieved from the address array 535 and output to bus 536. If an entry is not found in the address array 535, then address translation is performed by the TLB 534 according to x86 paging rules as alluded to above.

Each of the compare logic devices 526 determine whether their corresponding 20-bit indexed tag entry matches the 20-bit physical page number provided via bus 536. Note that bits 13 and 12 of the linear address are provided to both the TLB 534 and the tag ways 522, thus providing the potential for 4-way aliasing within each of the tag ways 522. In the embodiment shown in FIG. 4, logic within each of the tag ways 522 ensures that tag aliasing does not occur due to the overlap of bits provided to the TLB 534 and the tag ways 522. In addition, for clarity of discussion, logic to ensure the uniqueness of tag entries and to indicate the validity of cache lines is not shown in FIG. 5.

If one of the indexed tags matches the physical page number provided via bus 536, then the corresponding compare logic 526 asserts its select signal 527, thereby designating a cache hit. Accordingly, the way selection logic 533, forwards the cache sub-line and corresponding predecode fields for translation via bus 537.

Figure 6:
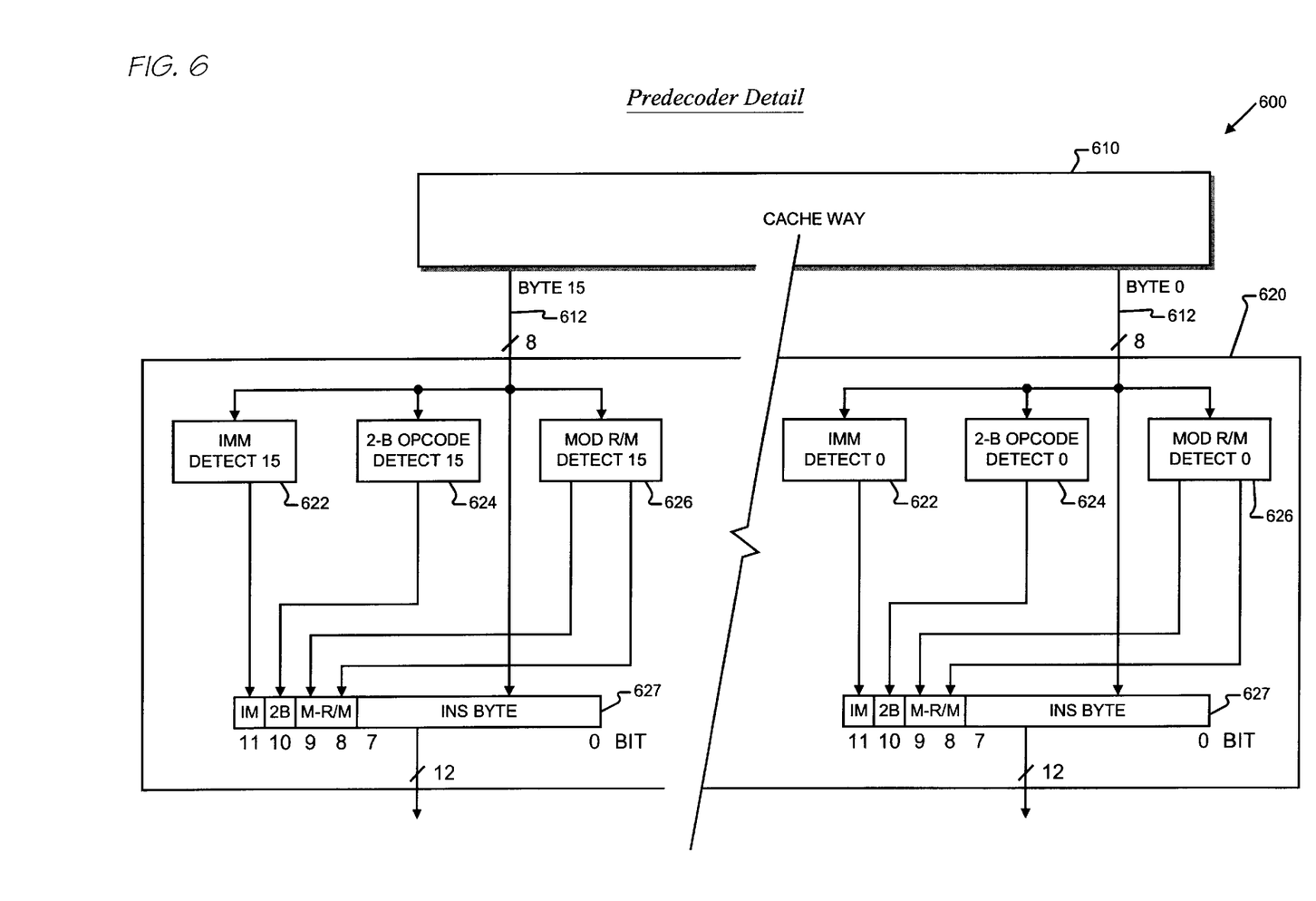
FIG. 6 is a block diagram depicting details of a predecoder according to the present invention.

Now referring to FIG. 6, a block diagram 600 is presented depicting details of one embodiment of a predecoder 620 according to the present invention that is directed toward determining initial information indicating the length of x86 macro instructions. In the embodiment shown in the block diagram 600, a predecoder receives a 16-byte cache sub-line from a cache way 610 prior to the determination of a cache hit. Hence, within the instruction fetch logic 500 illustrated by FIG. 5, the predecoder 620 of FIG. 6 represents one of the four predecoders 525 that correspond to each of the four cache ways 524. Each of the 16 bytes from the cache way 610 is provided via a bus 612 to 16 identical logic configurations that include immediate field detection logic 622, 2-byte opcode detection logic 624, mod r/m field detection logic 626, and a predecode output register 627. For clarity of illustration, only that logic corresponding to byte 0 and byte 15 are shown in the FIGURE.

Operationally, the cache sub-line bytes are provided in parallel to the byte predecode logic via bus 612. Each of the cache sub-line bytes are transferred without modification to their corresponding predecode output register 627. In parallel, each sub-line byte is also distributed to corresponding immediate field detection logic 622, 2-byte opcode detection logic 624, and mod r/m field detection logic 626. If the byte is equal to 0Fh, then the 2-byte opcode logic 624 sets bit 10 of the predecode output register 627, thus indicating a 2-byte opcode for an associated x86 macro instruction. The immediate field detection logic 622 examines the byte to determine if the associated x86 macro instruction has an immediate field. If so, the immediate field detection logic 622 sets bit 11 of the predecode output register 627. The mod r/m detection logic examines the byte to determine if the associate x86 macro instruction has a mod r/m field. If so, bit 8 of the predecode output register 627 is set for 2-byte opcode instructions. For 1-byte opcode instructions having an mod r/m field, bit 9 is set. Hence, in the embodiment of FIG. 6, predecode information corresponding to each byte in a cache sub-line is four bits in length. The initial information contained within bits 11-8 of each of the predecode output registers 627 enable a translator according to the present invention to determine the length of the associated x86 macro instruction.

Figure 7:
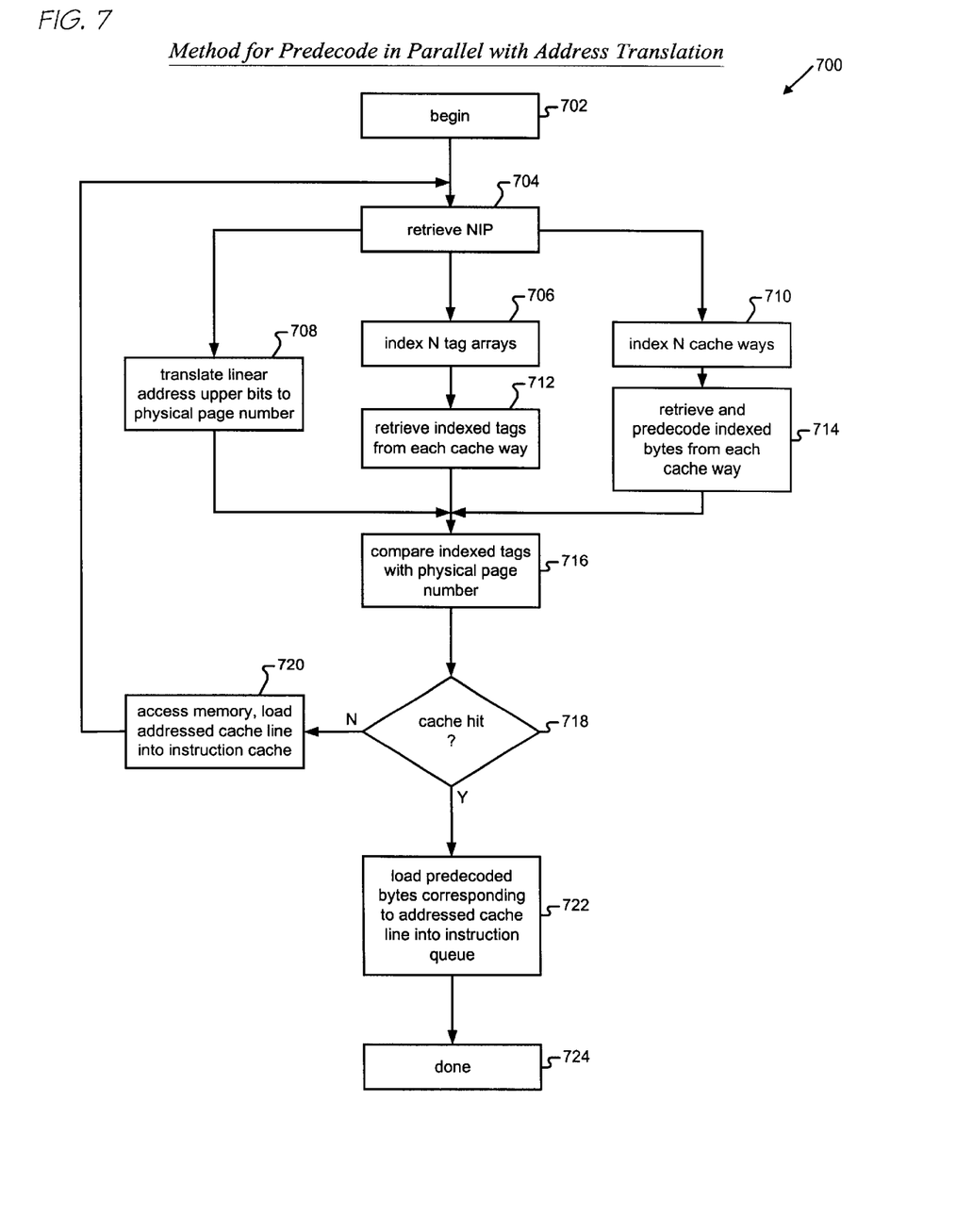
FIG. 7 is a flow chart illustrating a method according to the present invention for predecoding macro instructions in an instruction cache in parallel with retrieval of a physical address from a translation lookaside buffer.

Now referring to FIG. 7, a flow chart 700 is presented illustrating a method according to the present invention for predecoding macro instructions in an instruction cache in parallel with retrieval of a physical address from a translation lookaside buffer.

Flow begins in block 702, where translation logic within a pipeline microprocessor according to the present invention updates the contents of a next instruction pointer (NIP) to indicate the linear address of a macro instruction that is to be executed. Flow then proceeds to block 704.

At block 704, instruction fetch logic according to the present invention retrieves the contents of the NIP. The NIP is then provided in parallel to a translation lookaside buffer (block 708), a plurality of tag arrays (block 706), and a plurality of cache ways (block 710) that correspond to the plurality of tag arrays.

At block 708, the translation lookaside buffer translates upper bits of the linear address into upper address bits of a physical page number for the macro instruction. Flow then proceeds to block 716.

At block 710, low-order bits of the linear address are provided to each of the plurality of cache ways to index one cache line within each of the plurality of cache ways. Flow then proceeds to block 714.

At block 714, bytes within each of the indexed cache lines are retrieved from each of the plurality of cache ways and are predecoded by predecoders according to the present invention. Initial information fields corresponding to each of the predecode bytes is generated by the predecoders. Flow then proceeds to block 716.

At block 706, low-order bits of the linear address are provided to each of the plurality of tag arrays to index one tag within each of the plurality of tag arrays. Flow then proceeds to block 712.

At block 712, each of the indexed tags are retrieved from each of the plurality of tag arrays and are provide to tag comparison logic according to the present invention. Flow then proceeds to block 716.

At block 716, the tag comparison logic compares each of the indexed tags to the physical page number generated at block 708. Flow then proceeds to decision block 718.

At decision block 718, an evaluation is made to determine if a cache hit has occurred. A cache hit occurs if one of the indexed tags compared in block 716 matches the physical page number. If a hit has occurred, the flow proceeds to block 722. If a cache miss has occurred, then flow proceeds to block 720.

At block 720, since the macro instruction is not present within the cache, then the instruction fetch logic accesses external memory using the physical address generated in block 708 to load an addressed cache line into the instruction cache. Flow then proceeds to blow 704.

At block 722, since the macro instruction is within the cache, the instruction bytes and corresponding initial information fields from the cache way containing the macro instruction are transferred to an instruction queue for translation. Flow then proceeds to block 724.

At block 724, the method completes.

Although the present invention and its objects, features, and advantages have been described in detail herein, other embodiments are encompassed by the invention. For example, the present invention has been particularly characterized in terms of an x86-compatible microprocessor having logic element capable of determining initial information concerning x86 macro instruction. But as was noted above, application programs other than those utilizing x86 macro instructions comprise a significant percentage of those used within the desktop computing area. The present invention affords a more effective way of predecoding macro instructions, particularly within a pipeline microprocessor that employs virtual addressing. Any instruction set architecture will benefit from the features provided by the present invention.

In addition, the present invention has been presented in language directed toward determining initial information about variable length instructions. By and large, this is the most significant application of predecoding logic within a present day pipeline microprocessor. But it is not the only application. Enhancements to instruction sets are periodically being developed that would otherwise burden translation of instructions. One specific example relates to the translation of single-instruction, multiple data instructions (SIMD) used within graphics applications. The detection of such instructions to enable routing of the instructions to special execution logic is entirely comprehended by the present invention.

Finally, it should be apparent to those skilled in the art that the description of instruction fetch logic according to the present invention is illustrative in the sense that 4-way 512-entry cache ways are described. Such an embodiment only exemplifies what is typical to present day microprocessors. The present invention certainly anticipates any direct mapped instruction cache architecture wherein address translation must be performed in order to determine a cache hit.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. An apparatus in a pipeline microprocessor for predecoding macro instructions, the apparatus comprising:

an instruction cache, configured to store instruction bytes, said instruction cache comprising a plurality of cache ways, said instruction cache comprising a plurality of tag arrays, each of said plurality of tag arrays coupled to a corresponding cache way, and storing tags within, wherein specific tags within said each of said plurality of tag arrays denote specific physical page addresses associated with corresponding cache lines within said cache ways;

predecode logic, coupled to said instruction cache, configured to predecode instruction bytes retrieved from each of said plurality of cache ways, wherein said each of said plurality of cache ways comprises cache lines, and wherein said instruction bytes are stored within said cache lines, and wherein low-order bits of a requested linear address are provided to said each of said plurality of cache ways to indicate said instruction bytes, and wherein said low-order bits are provided to said plurality of tag arrays to retrieve a corresponding plurality of indexed tags, each of said plurality of tags being retrieved from a corresponding each of said plurality of tag arrays;

way selection logic, coupled to said predecode logic, configured to provide for translation a set of said instruction bytes and associated predecode data entities that correspond to one of said each of said plurality of cache ways;

a translation lookaside buffer, coupled to said way selection logic, configured to translate upper address bits of said requested linear address into a requested physical page address; and tag compare logic, coupled to said translation lookaside buffer, configured to compare said requested physical page address with said corresponding plurality of tags, and configured to select one of said plurality of tags that matches said requested physical page address, thereby denoting said one of said each of said plurality of cache ways, wherein said tag compare logic directs said way selection logic to provide said set of said instruction bytes and said associated predecode data entities for translation;

wherein said predecode logic predecodes said instruction bytes while said translation lookaside buffer converts said upper address bits of said requested linear address into said requested physical page address.

2. The apparatus as recited in claim 1, wherein said predecode logic generates a predecode data entity for each of said indexed instruction bytes.

3. The apparatus as recited in claim 2, wherein said predecode data entity comprises:
   a 2-byte opcode indicator, for indicating that a corresponding one of said instruction bytes is associated with a macro instruction having a 2-byte opcode;
   an immediate indicator, for indicating that said corresponding one of said instruction bytes is associated with a second macro instruction having an immediate field; and
   a mod r/m indicator, for indicating that said corresponding one of said instruction bytes is associated with a macro instruction having a mod r/m field.

4. The apparatus as recited in claim 3, wherein said predecode data entity is four bits in length.

5. An instruction predecoding apparatus within a pipeline microprocessor, for predecoding bytes of an instruction associated with a next instruction pointer, comprising:
   a plurality of predecoders, for generating predecode data entities corresponding to each of a plurality of indexed instruction bytes, said plurality of indexed instruction bytes being received from a plurality of cache ways and being indexed by low-order bits of the next instruction pointer, wherein said plurality of cache ways stores said plurality of indexed instruction bytes as cache lines, and wherein each of said cache lines are 32 bytes in length, and wherein said low-order bits index 16 of said plurality of indexed instruction bytes from each of said plurality of cache ways;
   a translation lookaside buffer, coupled to said plurality of cache ways, for receiving upper bits of the next instruction pointer, and for translating said upper bits into a physical page number;
   select logic, coupled to said plurality of predecoders, for providing a subset of said plurality of indexed instruction bytes and a corresponding subset of said predecode data entities for decoding, wherein said subset of said plurality of indexed instruction bytes contains the bytes of the instruction and is provided from one of said plurality of cache ways;
   a plurality of tag arrays, for storing tags corresponding to said cache lines, wherein each of said tags within denote a specific physical page number corresponding to a specific cache line, and wherein said low-order bits are employed to retrieve indexed tags, each of said indexed tags being retrieved from a corresponding each of said plurality of tag arrays; and
   tag compare logic, coupled to said translation lookaside buffer, for comparing said physical page number with said indexed tags, and for designating that said subset of said plurality of indexed instruction bytes comes from said one of said plurality of cache ways, wherein said tag compare logic directs said select logic to provide said subset of said plurality of indexed instruction bytes and said corresponding subset of predecode data entities for translation;
   wherein said plurality of predecoders predecode said indexed instruction bytes in parallel with the translation of said upper address bits of the next instruction pointer into said physical page number.

6. The instruction predecoding apparatus as recited in claim 5, wherein each of said predecode data entities comprise:
   a 2-byte opcode indicator, designating a corresponding macro instruction having a 2-byte opcode;
   an immediate indicator, designating a corresponding macro instruction having an immediate field; and
   a mod r/m indicator, designating a corresponding macro instruction having a mod r/m field.

7. The instruction predecoding apparatus as recited in claim 6, wherein said each of said predecode data entities is four bits in length.

8. A pipeline microprocessor that determines associated initial information about bytes of an instruction prior to translating the instruction into associated micro instructions, the pipeline microprocessor comprising:
   an instruction cache, configured to store the instruction, said instruction cache comprising:
      cache ways, each configured to store cache lines retrieved from memory, wherein the bytes of the instruction are stored within a specific indexed cache line within a specific cache way, and wherein said specific indexed cache line is one of a plurality of indexed cache lines taken from each of said cache ways, wherein said instruction cache comprises four of said cache ways, and wherein each of said cache ways store 512 of said cache lines;
      instruction predecoding logic, coupled to said cache ways, for determining initial information concerning each of said plurality of indexed cache lines;
      a mux, coupled to said instruction predecoding logic, for selecting said specific cache way, and for providing the bytes of the macro instruction, along with corresponding specific initial information bytes for translation; and
      tag arrays, each configured to store tags associated with each of said cache lines; and
      TLB logic, coupled to said instruction cache, for translating a linear address corresponding to the macro instruction into a physical page address, and for directing said mux to select said specific cache way, wherein said TLB logic compares said physical page address to indexed tags taken from each of said tag arrays to determine which of said cache ways contains the bytes of the instruction, and wherein said TLB logic directs said mux to provide the bytes of the instruction along with the associated initial information for translation;

wherein said instruction predecoding logic determines said initial information while said TLB logic translates said linear address.

9. The pipeline microprocessor as recited in claim 8, wherein the associated initial information comprises predecode fields corresponding to each of the bytes of the instruction.

10. The pipeline microprocessor as recited in claim 9, wherein each of said predecode fields is four bits in length.

11. A method for predecoding macro instructions in a pipeline microprocessor, comprising:
   a) retrieving indexed cache line bytes from each of a plurality of cache ways;
   b) translating a linear address into a requested physical page address;
   c) in parallel with said translating, predecoding the indexed cache line bytes to generate corresponding bytes of predecode information; and
   d) providing for instruction decoding, a subset of the indexed cache line bytes and a subset of the corresponding bytes of predecode information.

12. The method as recited in claim 11, wherein said retrieving comprises:
   i) indexing the plurality of cache ways with low-order bits of a next instruction pointer; and
   ii) obtaining cache line bytes from each of the plurality of cache ways that correspond to cache line entries that are addressed by the low-order bits.

13. The method as recited in claim 12, wherein said indexing comprises indexing four cache ways, wherein each of the four cache ways can address 512 cache line entries.

14. The method as recited in claim 13, wherein said predecoding generates the corresponding bytes of predecode information for the cache line bytes from all of the plurality of cache ways.

15. The method as recited in claim 14, wherein said predecoding comprises:
   i) first specifying if a macro instruction associated with a specific indexed cache line byte has a two-byte opcode;
   ii) second specifying if the macro instruction associated with the specific indexed cache line byte has an immediate field; and
   iii) third specifying if the macro instruction associated with the specific indexed cache line byte has a mod r/m field.

16. The method as recited in claim 15, wherein said providing comprises:
   i) comparing the physical page address to a set of indexed tags that correspond to the indexed cache line bytes, the tags designating particular physical page addresses;
   ii) designating a specific cache way whose specific indexed tag matches the requested physical page address; and
   iii) directing selection logic to provide the subset of the indexed cache line bytes and the subset of the corresponding bytes of predecode information that corresponds to the specific cache way.

* * * * *